(12) United States Patent
Matsumoto

(10) Patent No.: US 10,084,881 B2
(45) Date of Patent: Sep. 25, 2018

(54) INFORMATION PROCESSING TERMINAL AND BROWSER STORAGE MANAGEMENT METHOD

(71) Applicant: CANON KABUSHIKI KAISHA, Tokyo (JP)

(72) Inventor: Tetsuya Matsumoto, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 276 days.

(21) Appl. No.: 14/843,052

(22) Filed: Sep. 2, 2015

(65) Prior Publication Data
US 2016/0072914 A1 Mar. 10, 2016

(30) Foreign Application Priority Data
Sep. 5, 2014 (JP) ................................. 2014-181597

(51) Int. Cl.
| G06F 15/16 | (2006.01) |
| H04L 29/08 | (2006.01) |
| G06F 21/78 | (2013.01) |
| H04L 29/06 | (2006.01) |

(52) U.S. Cl.
CPC ............ *H04L 67/306* (2013.01); *G06F 21/78* (2013.01); *H04L 63/083* (2013.01); *H04L 67/02* (2013.01); *H04L 67/2842* (2013.01)

(58) Field of Classification Search
USPC ........................................................ 709/217
See application file for complete search history.

(56) References Cited

U.S. PATENT DOCUMENTS

| 5,784,058 A * | 7/1998 | LaStrange ......... G06F 17/30899 707/E17.119 |
| 5,796,393 A * | 8/1998 | MacNaughton .... G06F 17/3089 707/E17.116 |
| 5,873,100 A * | 2/1999 | Adams .................. G06F 12/126 |
| 5,933,142 A * | 8/1999 | LaStrange ......... G06F 17/30899 707/E17.119 |
| 6,020,884 A * | 2/2000 | MacNaughton .... G06F 17/3089 707/E17.116 |

(Continued)

FOREIGN PATENT DOCUMENTS

| JP | H11-272614 A | 10/1999 |
| JP | 2002-055866 A | 2/2002 |

(Continued)

OTHER PUBLICATIONS

Japanese Office Action dated Apr. 20, 2018 in corresponding Japanese Patent Application No. 2014-181597, together with English translation.

*Primary Examiner* — Alicia Baturay
(74) *Attorney, Agent, or Firm* — Carter, DeLuca, Farrell & Schmidt, LLP

(57) ABSTRACT

It is determined whether a user has logged in to a web browser. If the user has logged in to the web browser, local storage data is encrypted and stored in a user-specific storage. If the user has logged in to the web browser, local storage data is decrypted and acquired from the user-specific storage. If the user has logged in to the web browser, data in the user-specific storage is deleted. If the user has not logged in, data is stored in a shared storage without encryption.

19 Claims, 11 Drawing Sheets

(56) References Cited

U.S. PATENT DOCUMENTS

| | | | | |
|---|---|---|---|---|
| 6,192,398 B1* | 2/2001 | Hunt | G06F 17/30902 | 707/999.01 |
| 6,253,234 B1* | 6/2001 | Hunt | G06F 17/30902 | 707/999.01 |
| 6,427,175 B1* | 7/2002 | Khan | G06F 17/30884 | 707/E17.114 |
| 6,433,795 B1* | 8/2002 | MacNaughton | G06F 17/3089 | 707/E17.116 |
| 6,950,852 B1* | 9/2005 | Kobayaghi | H04L 29/06 | 709/204 |
| 7,139,795 B2* | 11/2006 | Davis | G06F 17/30873 | 709/204 |
| 7,287,054 B2* | 10/2007 | Lee | H04M 3/567 | 709/204 |
| 7,426,537 B2* | 9/2008 | Lee | G06Q 10/107 | 709/204 |
| 8,041,763 B2* | 10/2011 | Kordun | G06F 17/30884 | 709/203 |
| 8,140,855 B2* | 3/2012 | Zhu | G06F 21/34 | 713/184 |
| 8,239,367 B1* | 8/2012 | Zamir | G06F 17/30884 | 707/710 |
| 8,407,768 B1* | 3/2013 | Hayter | H04L 63/0853 | 726/5 |
| 8,407,773 B1* | 3/2013 | Hayter | H04L 67/16 | 726/7 |
| 8,442,961 B2* | 5/2013 | Ferri | G06F 17/30884 | 707/694 |
| 8,488,942 B2* | 7/2013 | Smith | H04N 21/4788 | 386/239 |
| 8,527,591 B2* | 9/2013 | Pirnazar | G06F 17/30873 | 709/205 |
| 8,528,064 B2* | 9/2013 | Nichols | G06F 21/41 | 726/5 |
| 8,533,350 B2* | 9/2013 | Jakobsson | H04L 67/42 | 709/229 |
| 8,739,249 B1* | 5/2014 | Kay | G06F 21/00 | 709/217 |
| 8,769,558 B2* | 7/2014 | Navar | G06Q 30/02 | 725/14 |
| 8,817,054 B1* | 8/2014 | Fisher | G06T 1/60 | 345/684 |
| 8,818,983 B1* | 8/2014 | Truong | G06F 17/30864 | 707/706 |
| 9,177,150 B1* | 11/2015 | Kay | G06F 21/64 | |
| 9,219,719 B1* | 12/2015 | Jagpal | H04L 63/062 | |
| 9,369,284 B2* | 6/2016 | McCoy | H04L 67/02 | |
| 9,413,840 B2* | 8/2016 | Taylor | H04L 67/2814 | |
| 9,465,596 B2* | 10/2016 | Kay | G06F 9/45504 | |
| 9,535,755 B2* | 1/2017 | Kay | G06F 9/5016 | |
| 9,542,368 B1* | 1/2017 | Dorwin | G06F 21/6209 | |
| 9,613,011 B2* | 4/2017 | Lund | H04W 4/21 | |
| 9,817,646 B1* | 11/2017 | Chen | G06F 8/61 | |
| 9,832,258 B2* | 11/2017 | Kay | H04L 67/1095 | |
| 2004/0093562 A1* | 5/2004 | Diorio | G06F 17/30873 | 715/205 |
| 2009/0241017 A1* | 9/2009 | Brooks | G06F 17/30884 | 715/206 |
| 2010/0306658 A1* | 12/2010 | Ariyoshi | G06F 17/30884 | 715/733 |
| 2014/0215333 A1* | 7/2014 | Dhanyamraju | G11B 27/105 | 715/716 |
| 2014/0237347 A1* | 8/2014 | Jeyachandran | G06F 17/241 | 715/234 |
| 2015/0319197 A1* | 11/2015 | Capt | H04W 4/06 | 709/203 |

FOREIGN PATENT DOCUMENTS

| | | |
|---|---|---|
| JP | 2003-131929 A | 5/2003 |
| JP | 2011-206962 A | 10/2011 |
| JP | 2013-061818 A | 4/2013 |

* cited by examiner

INFORMATION PROCESSING TERMINAL AND BROWSER STORAGE MANAGEMENT METHOD

BACKGROUND OF THE INVENTION

Field of the Invention

The present invention relates to an information processing terminal and a browser storage management method, which provide a data storage mechanism for a web browser in, for example, HTML5.

Description of the Related Art

Along with the growth in the functionality of web applications, various kinds of function extension have been done in HTML5. In particular, as mobile terminals such as a smartphone and a tablet have become widespread, many extensions to operate a web application offline have been done. An example of an extended function is an application cache function of caching a file on a web server into a storage area for a web browser. Another example is a web storage or indexed DB function of storing data in a storage area for a web browser. There also exists a file system API function of operating a file in a storage area for a web browser. The storage areas for a web browser in which data is stored by the above-described extended functions and the like will generically be referred to as a browser storage hereinafter. Still another example of the extended function is a web workers function of executing time-consuming processing or the like in the background.

As a conventional technique, a user management function of a web browser exists. With the user management function, data such as a bookmark, browsing history, setting information of the web browser, and data in the browser storage can be managed on a user basis. A browser storage that stores data on a user basis in a case where a user has logged in will be referred to as a user-specific storage or user storage hereinafter. On the other hand, a browser storage that stores data in a case where no user has logged in will be referred to as a normal storage.

Japanese Patent Laid-Open No. 2011-206962 discloses the technology of a multi function peripheral including a web browser. According to this technique, the multi function peripheral includes a mode setting unit capable of selecting a user authentication enabled mode and a user authentication disabled mode. In the user authentication disabled mode, cookie information is discarded after the end of the operation of the web browser. This makes it possible to reduce the security risk of individual information leakage by cookie information.

Anyone can easily refer to data stored in the browser storage. Hence, when a plurality of persons use one web browser, use of the browser storage is problematic from the viewpoint of security or privacy. In the above-described user management function of the web browser as well, anyone can easily switch the user. Hence, even in the user management function, use of the browser storage is problematic from the viewpoint of security or privacy. In addition, if data in the browser storage is discarded after the end of the operation of the web browser, as in Japanese Patent Laid-Open No. 2011-206962, the web application that uses the browser storage cannot normally be used.

SUMMARY OF THE INVENTION

The present invention has been made in consideration of the above-described problems, and provides an information processing terminal and a browser storage management method which can protect data in a browser storage, particularly, data in a user-specific storage from users other than a user who is the owner of the data without loss of convenience of the browser storage.

The present invention has the following arrangement. That is, an information processing terminal in which a web browser as an application operates on an operating system, comprises: a reception unit configured to receive data to be saved in a reserved area reserved for the web browser from a web site accessed via the web browser; and a saving unit configured to, in a case where specific user information is input to the web browser to login, encrypt the received data and save the data in a storage out of the reserved area corresponding to the specific user information.

According to the present invention, it is possible to protect data in a user-specific storage from users other than the owner without loss of convenience of the browser storage.

Further features of the present invention will become apparent from the following description of exemplary embodiments with reference to the attached drawings.

DESCRIPTION OF THE EMBODIMENTS

An information processing terminal and a browser storage management method according to an embodiment of the present invention will now be described with reference to the accompanying drawings.

First Embodiment

<Description of System Configuration>

Figure 1:
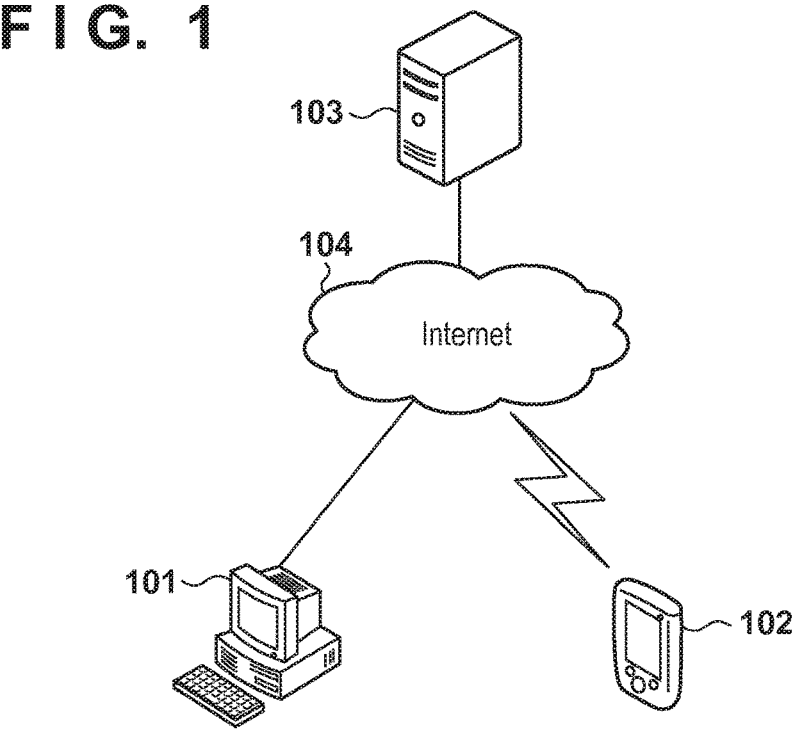
FIG. 1 is a schematic view showing a system configuration according to an embodiment of the present invention.

FIG. 1 is a schematic view showing a system configuration according to the embodiment of the present invention. Referring to FIG. 1, an information terminal (to be also referred to as an information processing apparatus or information processing terminal) 101 such as a PC (Personal Computer), an information terminal 102 such as a smartphone, and a web server 103 that provides a web page to each information terminal are communicably connected to each other by a known technology such as the Internet 104. Note that the information terminal 102 performs wireless communication. Although not illustrated, each of the information terminals 101 and 102 may include a plurality of information terminals.

<Functional Arrangement of Web Browser>

Figure 2:
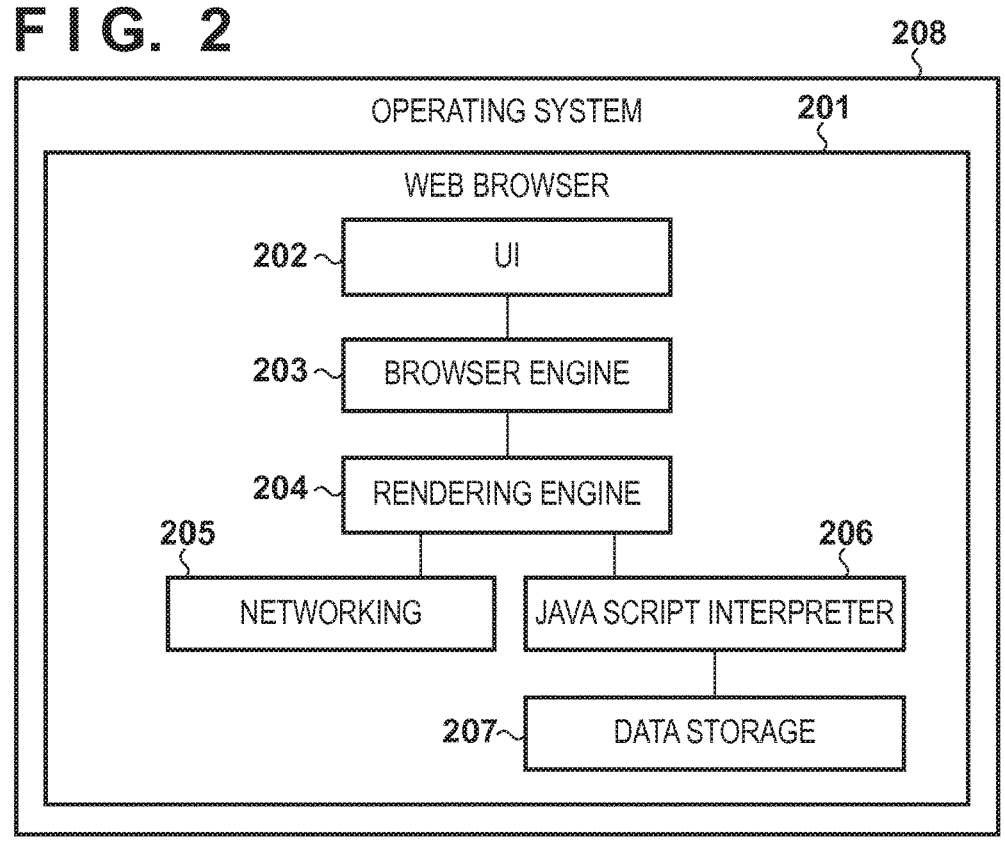
FIG. 2 is a block diagram showing an example of the functional arrangement of a web browser.

FIG. 2 is a block diagram showing an example of the functional arrangement of a web browser 201 that operates on each of the information terminals 101 and 102 shown in FIG. 1. The web browser 201 operates on an operating system (OS) 208 installed in each of the information terminals 101 and 102. A user interface (UI) 202 is the UI of the web browser, which includes URL display, bookmark display, web browser setting menu display, and the like. A browser engine 203 performs processing between the UI 202 and a rendering engine 204. The rendering engine 204 displays a requested content in HTML (HyperText Markup Language) or the like. A networking 205 performs message transmission/reception such as HTTP (Hypertext Transfer Protocol) request transmission or response reception via a network. A Java® script interpreter 206 analyzes and executes a Java® script code. A data storage 207 controls to store, in a storage device, data in an application cache, web storage, or indexed DB based on the specifications of the storage concerning a cookie or HTML5. In this embodiment, the data storage 207 that is a reserved area reserved for the web browser 201 will be referred to as a browser storage. That is, the data storage includes a user-specific storage managed for each user who is an owner, and a normal storage that is not associated with any user. Operations such as data storage, acquisition, and deletion by the data storage 207 can be controlled in accordance with the Java script.

When having accessed a web site, the web browser 201 downloads the cache manifest of the site. The web browser 201 has an application cache function of downloading resources described in the cache manifest as the cache target, for example, resources such as HTML data, a script, a media file such as an image, and a style sheet from the web site and caching them.

<Hardware Arrangement of Information Terminal 101>

Figure 3:
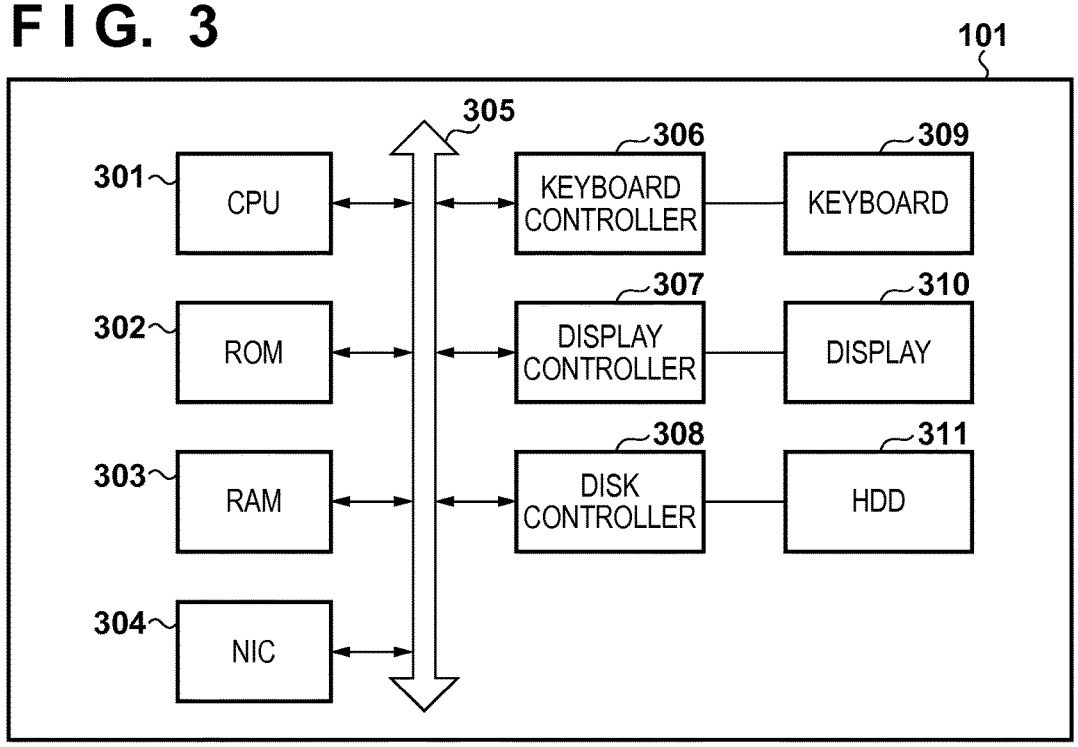
FIG. 3 is a block diagram showing an example of the hardware arrangement of an information terminal 101.

FIG. 3 is a block diagram showing an example of the hardware arrangement of the information terminal 101 on which the web browser 201 operates. The information terminal 101 includes a CPU 301 that executes software (programs) stored in a ROM 302 or a hard disk drive (HDD) 311 serving as a storage device. The CPU 301 generally controls each piece of hardware connected to a system bus 305 in accordance with the programs. A RAM 303 functions as the main memory or work area of the CPU 301. A network interface card (NIC) 304 bidirectionally exchanges data with other nodes via a network. A keyboard controller 306 controls instruction input from a keyboard 309 provided on the PC. A display controller 307 controls display on a display module 310 formed from, for example, a liquid crystal display. A disk controller 308 controls the hard disk drive (HDD) 311 that is a mass storage device. The hard disk drive (HDD) 311 stores various data and applications such as the operating system 208 and the web browser 201.

<Hardware Arrangement of Information Terminal 102>

Figure 4:
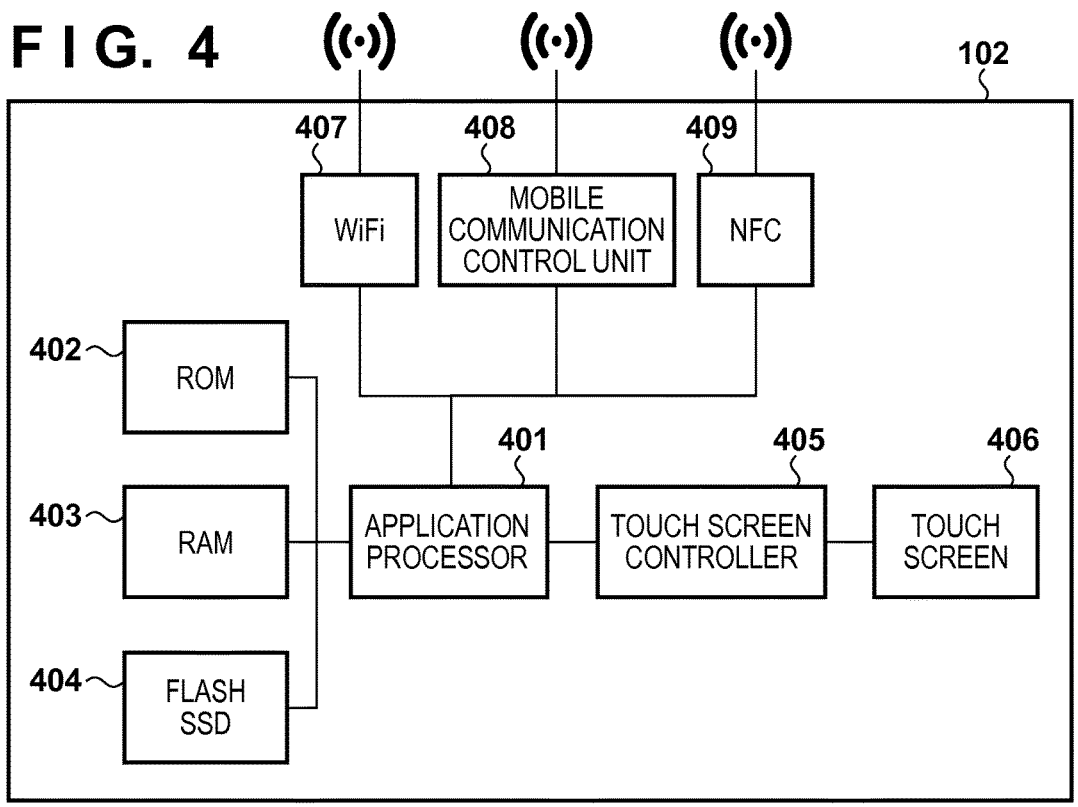
FIG. 4 is a block diagram showing an example of the hardware arrangement of an information terminal 102.

FIG. 4 is a block diagram showing an example of the hardware arrangement of the information terminal 102 on which the web browser 201 operates. The information terminal 102 includes an application processor (to be referred to as an AP hereinafter) 401 that executes software stored in a ROM 402 or a storage device 404. The AP 401 generally controls each piece of connected hardware. A RAM 403 functions as the main memory or work area of the AP 401. The storage device 404 is formed from a flash memory or the like. The storage device 404 stores various data and applications such as the operating system 208 and the web browser 201. A touch screen controller 405 controls a connected touch screen 406. A wireless LAN control unit 407, a mobile communication control unit 408, and a near field wireless communication control unit 409 control wireless LAN communication such as WiFi (Wireless Fidelity), mobile communication, and near field wireless communication, respectively. They will generically be referred to as wireless communication.

<Example of Login Screen to Web Browser>

Figure 5:
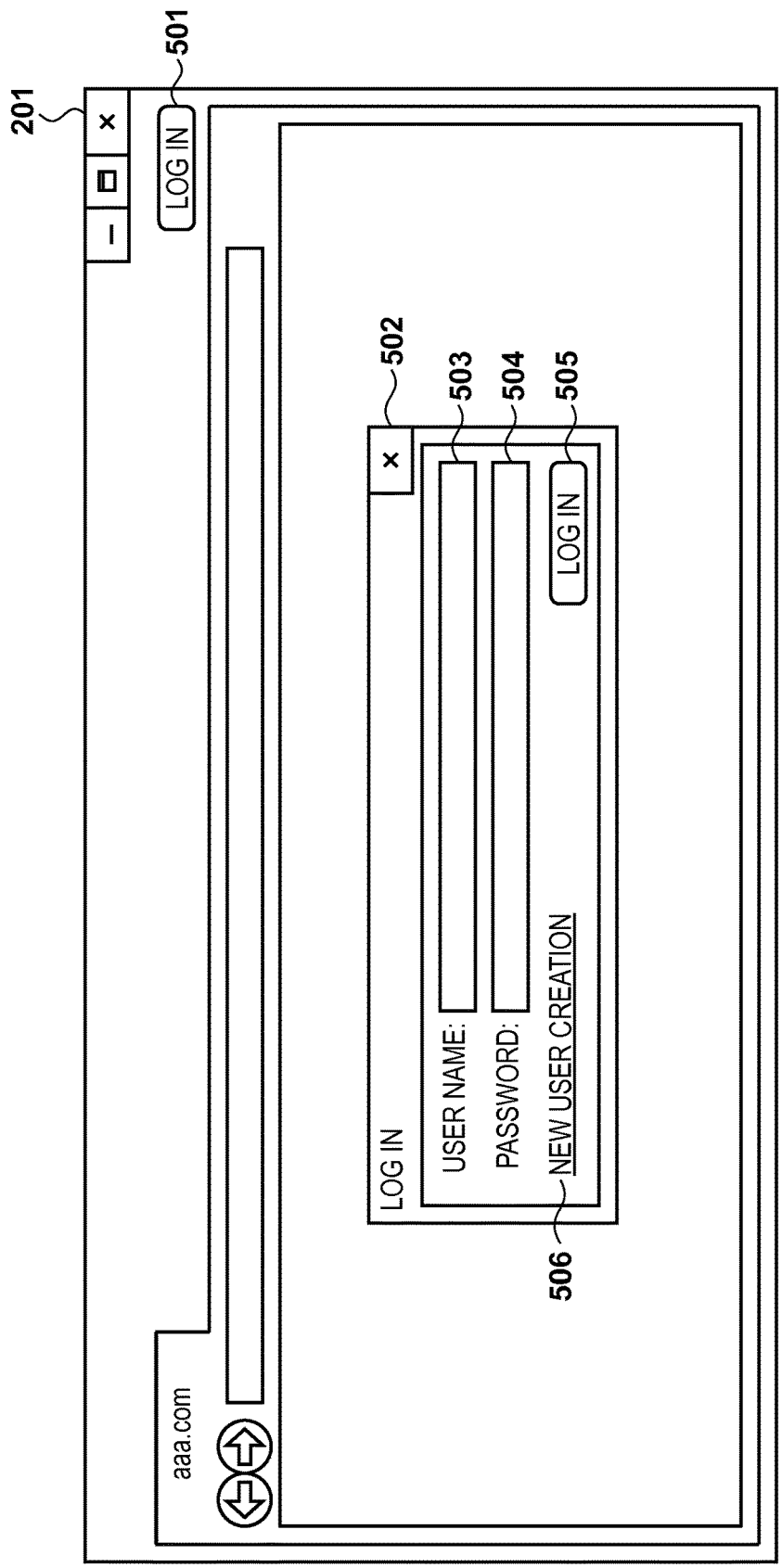
FIG. 5 is a view showing an example of a login screen to the web browser.

FIG. 5 is a view showing an example of a login screen to the web browser in the web browser 201. A display button 501 is a button used to display a login screen 502. The login window 502 is a login screen displayed by pressing the display button 501. The web browser 201 holds a set of a user name and a password, which are registered in advance, as user information. When a login button 505 is pressed, it is verified whether the combination of an input user name 503 and password 504 is correct. If the combination of the user name 503 and the password 504 is correct, the web browser 201 determines that the login has succeeded, and shifts to the login state by the user. If the combination of the user name 503 and the password 504 is incorrect, the web browser 201 determines that the login has failed, and does not shift to the login state.

A create button 506 is a button used to display a new user creation screen. When the create button 506 is pressed, the web browser 201 displays a screen to create a new user account and registers a new input user name 503 and a password 504 as a set, thereby creating a new user account. When a new user account is created, a local data import screen configured to import data stored in the normal storage or the user-specific storage of another registered user to the user-specific storage of the new user is displayed. Details of the local data import screen will be described later.

When a user logs in to the web browser 201, for example, a user-specific storage or normal storage is statically prepared, and a corresponding area is used in accordance with the login user. The present invention is not limited to this, as a matter of course. For example, a profile for each user or the user-specific storage of the login user may be loaded and replaced with a shared profile or normal storage provided for use in a case where the user has not logged in.

<Example of Login Confirmation Setting Screen>

Figure 6:
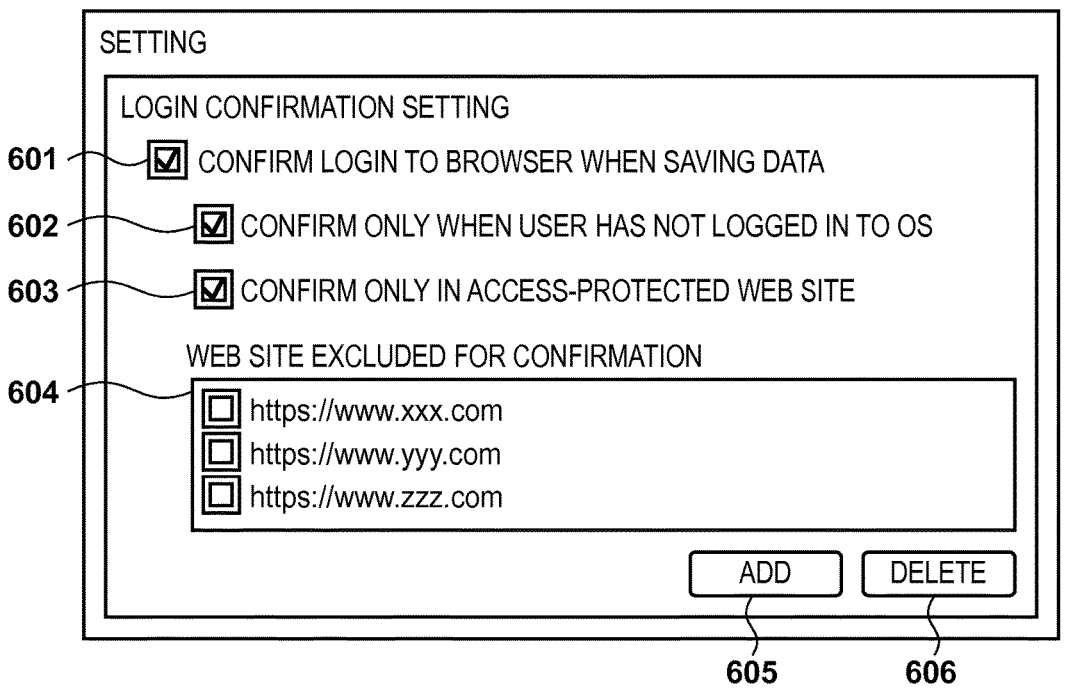
FIG. 6 is a view showing an example of a login confirmation setting screen to the web browser.

FIG. 6 is a view showing an example of a login confirmation setting screen of the web browser 201, which sets a situation to make the web browser confirm a user with login. In this screen, setting is made concerning whether to confirm a user with login (or prompt login) to the web browser before storing data in the browser storage in a case where the user has not logged in to the web browser.

A checkbox 601 is used to set whether to confirm a user with login to the web browser 201 before storing data in the browser storage in a case where the user has not logged in to the web browser 201. If the checkbox 601 is selected, the web browser 201 confirms login to the web browser.

Checkboxes 602, 603, and 604 are enabled when the checkbox 601 is selected, that is, when confirming login to the web browser. They are used to set conditions for login confirmation.

If the checkbox 602 is selected, the web browser 201 confirms login to the web browser only when the user has not logged in to the OS. When the user has not logged in to the OS, two or more persons are assumed to share the same account of the OS. This occurs in, for example, the OS of a portable terminal that neither provides a user account nor requests login. In this case as well, when the user logs in to the web browser 201, data in the browser storage can be managed on a user basis.

If the checkbox 603 is selected, the web browser confirms login to the web browser only when the user has accessed an access-protected web site. The access-protected web site here indicates a web site connected by HTTPS (Hypertext Transfer Protocol Secure) or a web site that needs login to the web site.

The exempt URL list 604 is a URL list used to designate web sites in which login to the web browser is not confirmed regardless of settings in the screen. When the user accesses a web site including a URL designated in the URL list 604, the web browser controls not to confirm login to the web browser regardless of settings in the screen. An add button 605 is a button used to add a URL to the URL list 604. When the add button 605 is pressed, a screen to input a URL is displayed, and an input URL is added to the URL list 604. A delete button 606 is a button used to delete a URL in the URL list 604. When the delete button 606 is pressed, a selected URL is deleted from the URL list 604.

The setting contents set in the setting screen shown in FIG. 6 are held by the web browser. For example, the checkbox 601 is held as login confirmation setting information, the checkbox 602 is held as first confirmation condition information, the checkbox 603 is held as second confirmation condition information, and the URL list 604 is held as exempt information. In this embodiment, an example in which web browser login confirmation is set using the setting screen has been described. However, the web browser 201 may hold the setting contents in advance. The setting items shown in FIG. 6 may be set and held on a user basis, or all users may share the settings.

<Example of User-Specific Setting Screen>

Figure 7:
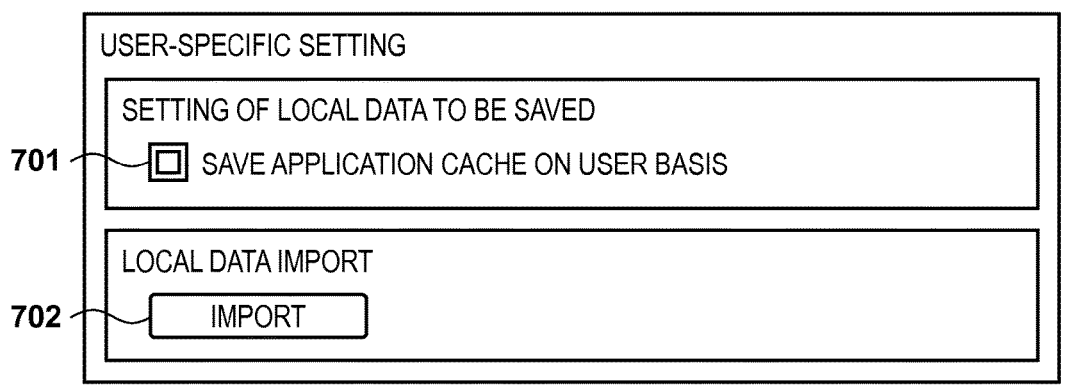
FIG. 7 is a view showing an example of a user-specific setting screen.

FIG. 7 is a view showing an example of a user-specific setting screen of the web browser 201. In this screen, a type of data to be stored in the user-specific storage is set. In addition, an execution instruction for processing of importing data stored in the normal storage or the user-specific storage of another user to the user-specific storage of the operation user is input. The execution instruction of data import to the user-specific storage can also be input when a new user is created by the new user creation 506 shown in FIG. 5.

A checkbox 701 is used to set whether to store an application cache in the user-specific storage. If the checkbox 701 is selected, the web browser stores an application cache in the user-specific storage. If the checkbox 701 is not selected, the web browser stores an application cache in the normal storage. That is, the web browser uses the application cache in the normal storage even in a user login state. An import button 702 is used to display a local data import screen. The selection state of the checkbox 701 is held as setting information, for example, storage destination setting information of the web browser 201. The setting items shown in FIG. 7 may be set and held on a user basis, or all users may share the settings.

Figure 8:
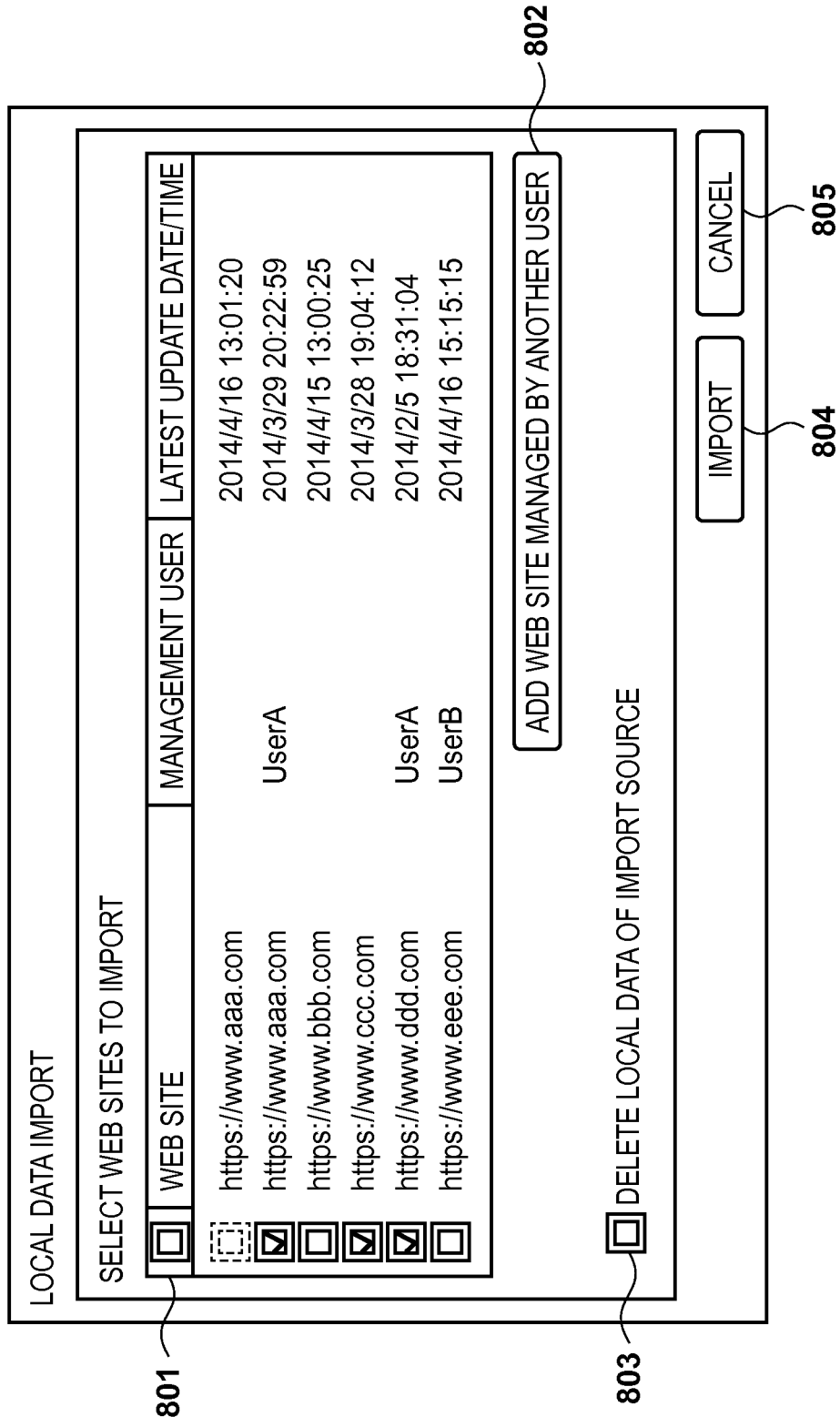
FIG. 8 is a view showing an example of a local data import screen.

FIG. 8 is a view showing an example of a local data import screen displayed by pressing the import button 702. This screen is also displayed when a new user is created by the new user creation 506 shown in FIG. 5. This enables data import to the user-specific storage of the newly created user at the time of new user creation.

A web site list 801 is used to designate data to be imported to the user-specific storage of the operation user on a web site basis. An add button 802 is a button used to display a screen to add a web site managed in the user-specific storage of another user. When the add button 802 is pressed, the web browser displays a screen to input a user name and a password. If the combination of the input user name and password is correct, web sites managed in the user-specific storage of the user are added to the web site list 801.

A checkbox 803 is used to set whether to delete the data of the import source of the web sites selected in the web site list 801. If the checkbox 803 is selected, the web browser deletes the data of the import source of the web sites selected (that is, checked) in the web site list 801 after completion of import. An execute button 804 is used to execute import processing in accordance with the settings in the screen. A cancel button 805 is used to close the screen without executing import processing.

<Data Storage Processing in Browser Storage>

Figure 9:
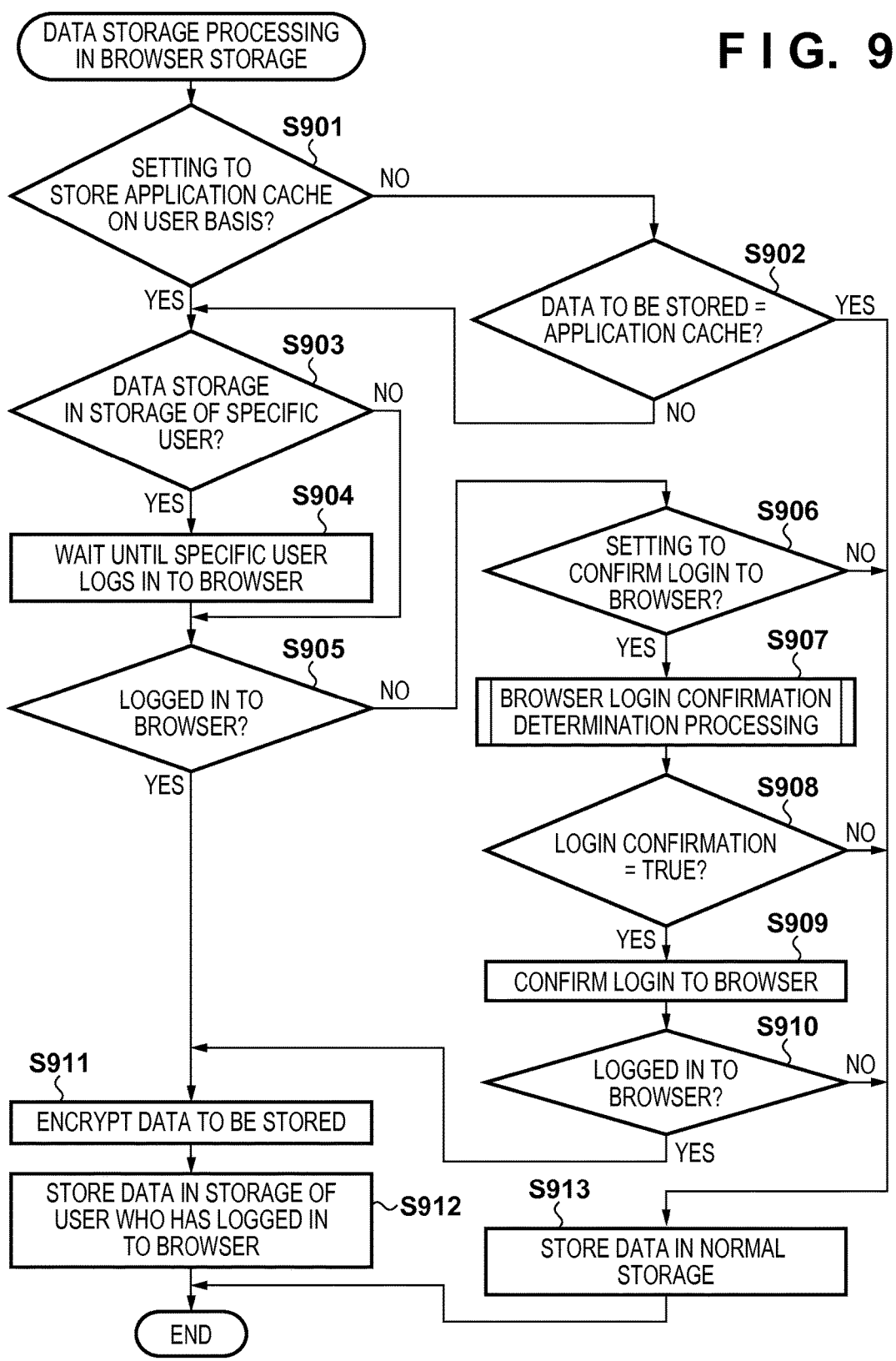
FIG. 9 is a flowchart showing an example of the procedure of data storage processing in a browser storage.

FIG. 9 is a flowchart showing an example of the procedure of processing executed when the web browser 201 stores data in the browser storage. The web browser 201 is executed by a processor such as the CPU 301 or the AP 401. When described in an interpreter language such as Java®, the processor executes an interpreter (not shown), and the web browser is thus interpreted and executed. In the following explanation, the interpreter will be described as the execution entity.

In this processing, when the user has logged in to the web browser 201, data is encrypted and stored in the user-specific storage. On the other hand, when the user has not logged in to the web browser 201, data is stored in the normal storage without being encrypted. Additionally, in this processing, when the user has not logged in to the web browser 201, login to the web browser is confirmed in accordance with the setting contents in the login confirmation setting screen shown in FIG. 6. Furthermore, in this processing, it is determined based on the setting contents in the user-specific setting screen shown in FIG. 7 whether to store data such as an application cache or resource in the normal storage or user-specific storage. Note that in the following explanation, the pieces of information set in the setting screens shown in FIGS. 6 and 7 are referred to. For the descriptive convenience, the information will sometimes be indicated by the reference numeral of the checkbox or list that sets the information. Of course, the pieces of set and held information are referred to. Data to be stored is delivered by a parameter or the like in the processing shown in FIG. 9.

When data storage processing in the browser storage starts, in step S901, the interpreter determines whether a setting to store an application cache in the user-specific storage has been made. This determination is done in accordance with the storage destination setting information set by the checkbox 701 shown in FIG. 7. If the interpreter determines that a setting to store an application cache in the user-specific storage has been made, the process advances to step S903. If the interpreter determines that a setting to store an application cache in the user-specific storage has not been made, the process advances to step S902.

Next, in step S902, the interpreter determines whether storage target data under processing is an application cache. If the interpreter determines that the storage target data under processing is an application cache, the process advances to step S913. If the interpreter determines that the storage target data under processing is not an application cache, the process advances to step S903.

In step S903, the interpreter determines whether data storage under processing is processing for the user-specific storage of a specific user. For example, if the processing shown in FIG. 9 operates as background processing for the user-specific storage of a specific user, the processing needs to be performed for the user-specific storage of the specific user. Hence, it is determined whether data storage under processing is processing for the user-specific storage of a specific user. This determination can be done based on, for example, the storage destination (for example, address) of the processing target. If the interpreter determines that data storage under processing is processing for the user-specific storage of a specific user, the process advances to step S904. If the interpreter determines that data storage under processing is not processing for the user-specific storage of a specific user, the process advances to step S905. Note that background processing for the user-specific storage of a specific user includes synchronization processing between the resource of a web site and the resource and application cache of a local storage, which is executed in accordance with the operation of a web worker. In the synchronization processing, synchronization is done for a newer one in principle. Hence, when synchronizing the local resource with the resource of a web site, the resource is downloaded from the web site in the synchronization processing, and the processing shown in FIG. 9 is executed.

In step S904, the interpreter waits until the specific user logs in to the browser. That is, if data storage under processing is processing for the user-specific storage of a specific user, the interpreter controls not to perform the processing until the specific user logs in to the browser. Note that the specific user indicates a user who is the owner of the user-specific storage determined in step S903. If the interpreter determines that the specific user has logged in to the browser or already logged in to the browser, the process advances to step S905. In step S904, the interpreter may wait for login in processing of another thread, or may prompt the user to log in by displaying a login window. This also applies to FIGS. 12 and 13.

In step S905, the interpreter determines whether the user has logged in to the browser. If the interpreter determines that the user has logged in to the browser, the process advances to step S911. If the interpreter determines that the user has not logged in to the browser, the process advances to step S906.

In step S906, the interpreter determines whether a setting to confirm login to the browser has been made. This determination is done in accordance with the setting by the checkbox 601 shown in FIG. 6. If the interpreter determines that a setting to confirm login to the browser has been made, the process advances to step S907. If the interpreter determines that a setting to confirm login to the browser has not been made, the process advances to step S913.

In step S907, the interpreter performs processing of determining whether to confirm login to the browser. Details of browser login confirmation determination processing will be described later.

In step S908, the interpreter determines whether it has been determined in step S907 to confirm login to the browser (whether a variable representing whether to confirm login to the browser is True). If the interpreter determines that it has been determined to confirm login to the browser, the process advances to step S909. If the interpreter determines that it has been determined not to confirm login to the browser, the process advances to step S913.

Figure 10:
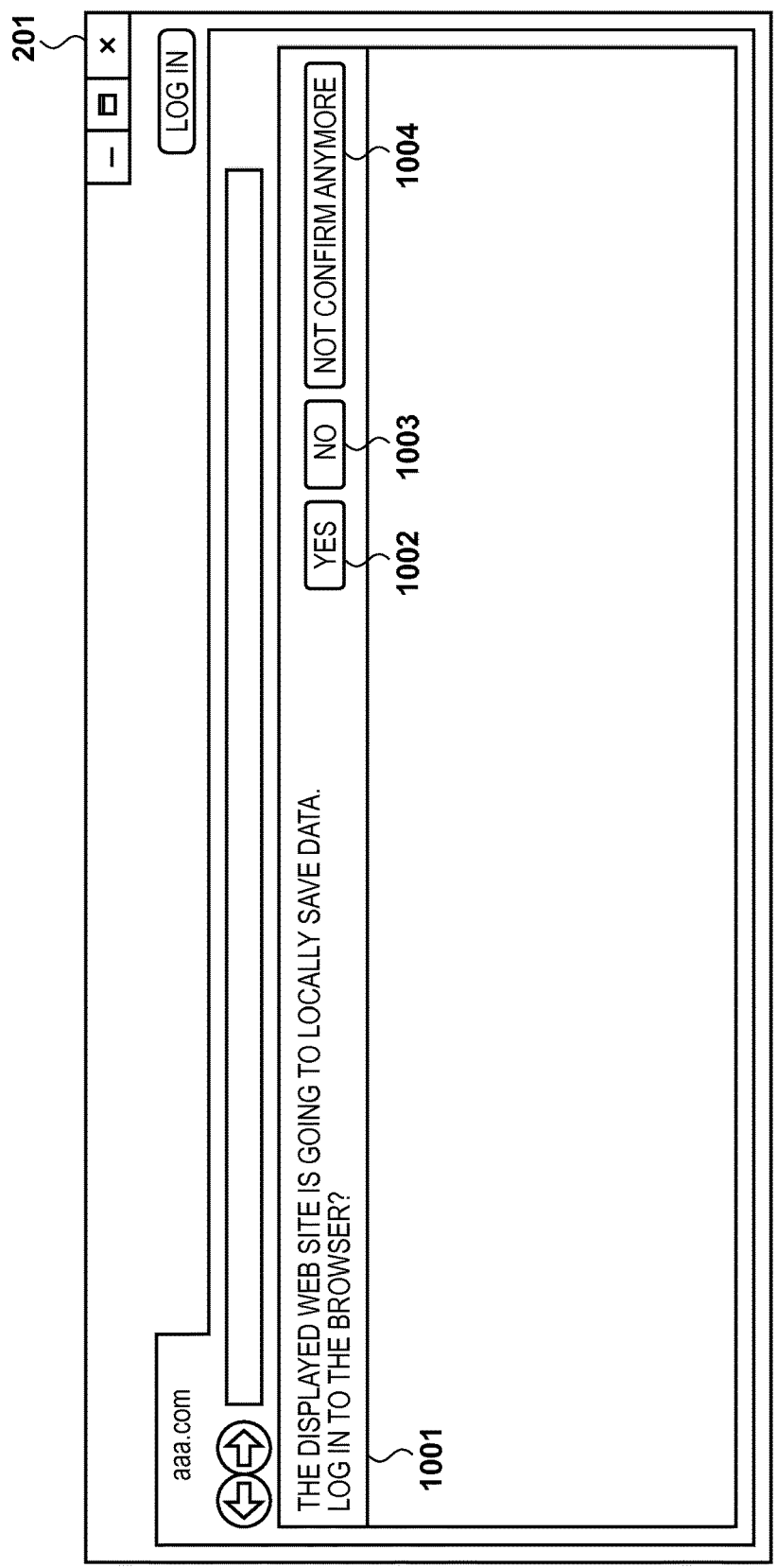
FIG. 10 is a view showing an example of a screen to confirm login to the web browser.

In step S909, to confirm the user with login to the browser, the interpreter displays a confirmation screen shown in FIG. 10 and notifies the user that he/she should log in to store data in the user-specific storage. FIG. 10 is a view showing an example of a screen to confirm login to the web browser. In this screen, a browser login confirmation message 1001 is displayed on the web browser 201. When a button 1002 is pressed, the login screen 502 shown in FIG. 5 is displayed. When a button 1003 is pressed, the state does not change to the login state. When a button 1004 is pressed, the state does not change to the login state, and the URL of the web site under browsing is added to the URL list 604 shown in FIG. 6. That is, login to the browser is not confirmed anymore for the web site under browsing.

In step S910, the interpreter determines whether the user has logged in to the browser in the browser login confirmation of step S909. If the interpreter determines that the user has logged in to the browser, the process advances to step S911. If the interpreter determines that the user has not logged in to the browser, the process advances to step S913.

In step S911, the interpreter encrypts the storage target data under processing.

In step S912, the interpreter stores the data encrypted in step S911 in the user-specific storage of the user who has logged in to the browser, and ends the processing.

On the other hand, in step S913, the interpreter stores the storage target data under processing in the normal storage, and ends the processing.

With the above-described procedure, according to the settings, when the user has logged in, data such as a resource is stored in the user-specific storage of the login user. For example, if processing is performed for the user-specific storage in synchronization processing that operates in the background, and the user is not in the login state, execution of storage processing waits until the user logs in. The processing is executed after the login state is attained.

<Browser Login Confirmation Determination Processing>

Figure 11:
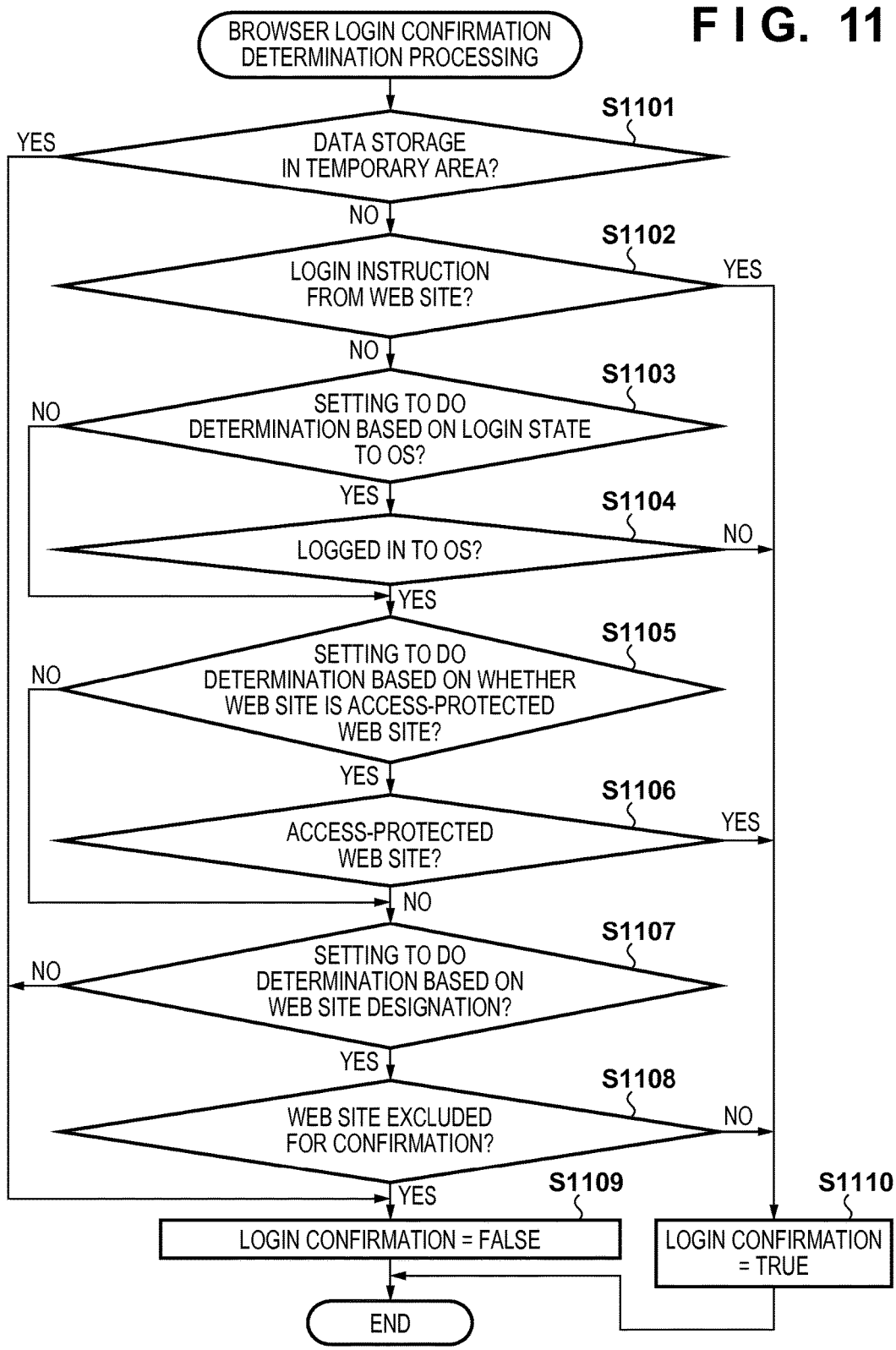
FIG. 11 is a flowchart showing an example of the procedure of web browser login confirmation determination processing.

FIG. 11 is a flowchart showing an example of the detailed procedure of browser login confirmation determination processing executed in step S907 shown in FIG. 9. In this processing, based on the setting contents in the login confirmation setting screen shown in FIG. 6 and the like, it is determined whether to confirm login to the web browser.

When browser login confirmation determination processing starts, in step S1101, the interpreter determines whether data storage under processing is data storage in a temporary area. As a characteristic feature of the web storage, there are an area called a local storage and an area called a session storage. Data stored in the local storage remains in the local storage area even after the web browser is closed. Data stored in the session storage is deleted when the web browser is closed. In this embodiment, a temporary storage area such as a session storage will generically be referred to as a temporary area. If the interpreter determines that data storage under processing is data storage in a temporary area, the process advances to step S1109. That is, if data storage under processing is data storage in a temporary area, it is determined not to confirm login because even if the user logs in, data is deleted when the web browser is closed. If the interpreter determines that data storage under processing is not data storage in a temporary area, the process advances to step S1102.

In step S1102, the interpreter determines whether a login instruction from the web site under browsing exists. The login instruction from the web site is considered to be described in, for example, a manifest file prepared by the web site. In this case, the determination of step S1102 can be done by referring to the manifest file. Also considerable is a method of instructing login as a Java script prepared by the web site invokes API (Application Programming Interface) prepared by the web browser to execute login confirmation. If the interpreter determines that a login instruction from the web site under browsing exists, the process advances to step S1110. If the interpreter determines that a login instruction from the web site under browsing does not exist, the process advances to step S1103.

In step S1103, the interpreter determines whether a setting to confirm login by the login state to the OS has been made. This determination is done in accordance with the setting of the checkbox 602 shown in FIG. 6. If the interpreter determines that a setting to confirm login by the login state to the OS has been made, the process advances to step S1104. If the interpreter determines that a setting to confirm login by the login state to the OS has not been made, the process advances to step S1105.

In step S1104, the interpreter determines whether the user has logged in to the OS. If the interpreter determines that the user has logged in to the OS, the process advances to step S1105. If the interpreter determines that the user has not logged in to the OS, the process advances to step S1110.

In step S1105, the interpreter determines whether a setting to confirm login depending on whether a web site is an access-protected web site has been made. This determination is done in accordance with the setting of the checkbox 603 shown in FIG. 6. If the interpreter determines that a setting to confirm login depending on whether a web site is an access-protected web site has been made, the process advances to step S1106. If the interpreter determines that a setting to confirm login depending on whether a web site is an access-protected web site has not been made, the process advances to step S1107.

In step S1106, the interpreter determines whether the web site under browsing is an access-protected web site. If the interpreter determines that the web site under browsing is an access-protected web site, the process advances to step S1110. If the interpreter determines that the web site under browsing is not an access-protected web site, the process advances to step S1107. Whether a web site is access-protected can be determined based on, for example, use of HTTPS, designation of an access limit by the user, or the like.

In step S1107, the interpreter determines whether a web site that does not confirm login to the browser is set. In this step, if the web site under browsing corresponds to a setting in the URL list 604 shown in FIG. 6, it is determined not to confirm login. If the interpreter determines that a web site that does not confirm login to the browser is set, the process advances to step S1108. If the interpreter determines that a web site that does not confirm login to the browser is not set, the process advances to step S1109.

In step S1108, the interpreter determines whether the web site under browsing is a web site that does not confirm login to the browser. If the interpreter determines that the web site under browsing is a web site that does not confirm login to the browser, the process advances to step S1109. If the interpreter determines that the web site under browsing is not a web site that does not confirm login to the browser, the process advances to step S1110.

In step S1109, the interpreter sets False to the variable representing whether to confirm login to the browser, and ends the processing. That is, it is determined to confirm login to the browser.

On the other hand, in step S1110, the interpreter sets True to the variable representing whether to confirm login to the browser, and ends the processing. That is, it is determined not to confirm login to the browser.

<Data Acquisition Processing from Browser Storage>

Figure 12:
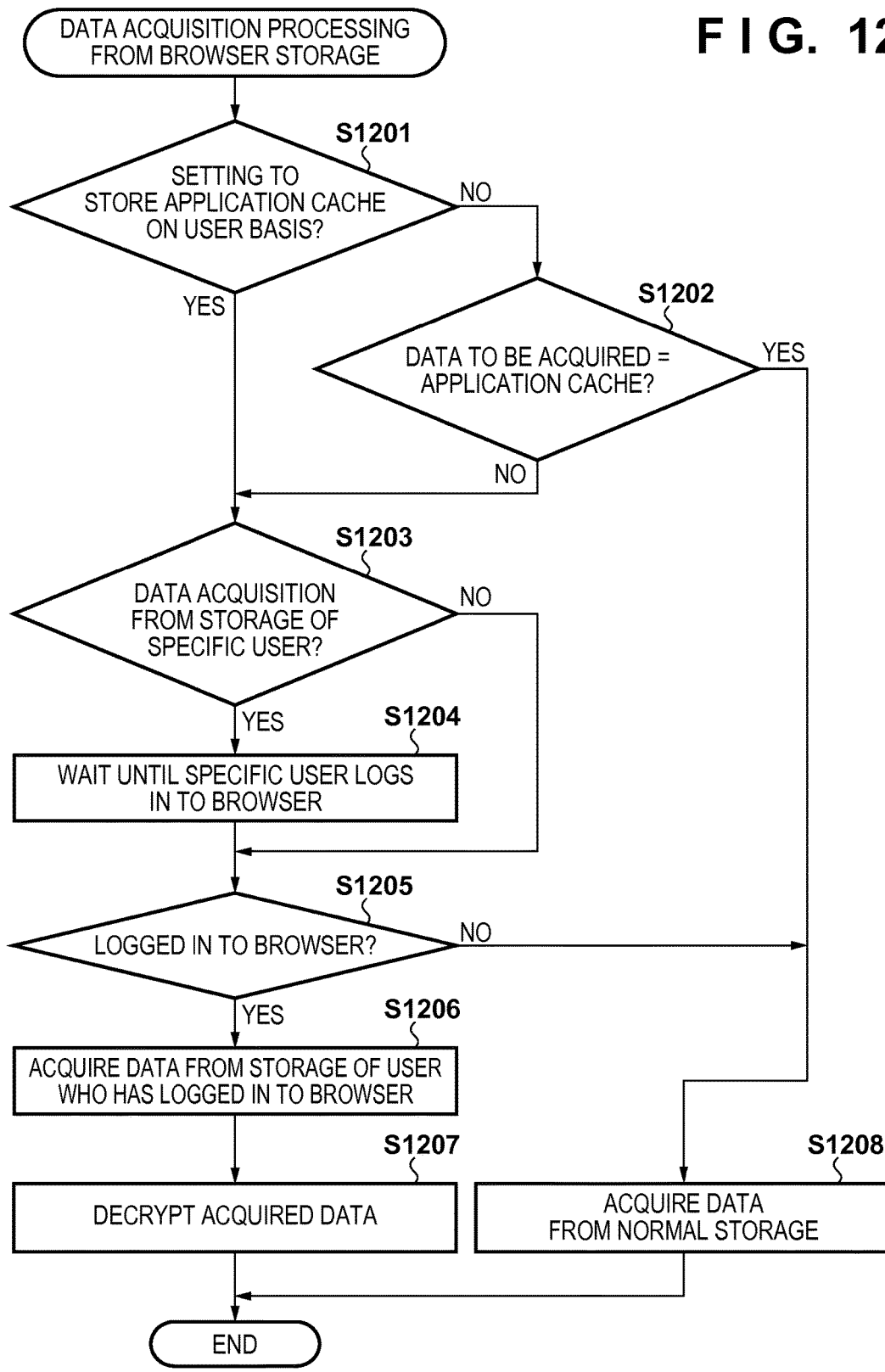
FIG. 12 is a flowchart showing an example of the procedure of data acquisition processing from the browser storage.

FIG. 12 is a flowchart showing an example of the procedure of processing executed when the web browser 201 acquires data from the browser storage. In this processing, when the user has logged in to the web browser 201, data is acquired from the user-specific storage of the user who has logged in and decrypted. On the other hand, when the user has not logged in to the web browser 201, data is acquired from the normal storage.

When data acquisition processing from the browser storage starts, in step S1201, the interpreter determines whether a setting to store an application cache in the user-specific storage has been made. This determination is done in accordance with the setting of the checkbox 701 shown in FIG. 7. If the interpreter determines that a setting to store an application cache in the user-specific storage has been made, the process advances to step S1203. If the interpreter determines that a setting to store an application cache in the user-specific storage has not been made, the process advances to step S1202.

Next, in step S1202, the interpreter determines whether acquisition target data under processing is an application cache. If the interpreter determines that the acquisition target data under processing is an application cache, the process advances to step S1208. If the interpreter determines that the acquisition target data under processing is not an application cache, the process advances to step S1203.

In step S1203, the interpreter determines whether data acquisition under processing is processing for the user-specific storage of a specific user. As in step S903, for example, if the processing shown in FIG. 12 operates as background processing for the user-specific storage of a specific user, the processing needs to be performed for the user-specific storage of the specific user. Hence, it is determined whether data acquisition under processing is processing for the user-specific storage of a specific user. This determination can be done based on, for example, the storage destination (for example, address) of the processing target. If the interpreter determines that data acquisition under processing is processing for the user-specific storage of a specific user, the process advances to step S1204. If the interpreter determines that data acquisition under processing is not processing for the user-specific storage of a specific user, the process advances to step S1205. Note that background processing for the user-specific storage of a specific user includes synchronization processing executed in accordance with the operation of a web worker. When synchronizing the resource of a web site with a local resource, the processing shown in FIG. 12 is executed in synchronization processing executed in the background to read data of the resource from the web storage or the like, and the readout data is transmitted and uploaded to the web site.

In step S1204, the interpreter waits until the specific user logs in to the browser. That is, if data acquisition under processing is processing for the user-specific storage of a specific user, the interpreter controls not to perform the processing until the specific user logs in to the browser. If the interpreter determines that the specific user has logged in to the browser or already logged in to the browser, the process advances to step S1205.

In step S1205, the interpreter determines whether the user has logged in to the browser. If the interpreter determines that the user has logged in to the browser, the process advances to step S1208. If the interpreter determines that the user has not logged in to the browser, the process advances to step S1206.

In step S1206, the interpreter acquires data from the user-specific storage of the user who has logged in to the browser. In step S1207, the interpreter decrypts the data acquired in step S1206, and ends the processing.

On the other hand, in step S1208, the interpreter acquires data from the normal storage, and ends the processing.

With the above-described procedure, according to the settings, when the user has logged in, data such as a resource is acquired from the user-specific storage of the login user. For example, if processing is performed for the user-specific storage in synchronization processing that operates in the background, and the user is not in the login state, execution of acquisition processing waits until the user logs in. The processing is executed after the login state is attained.

<Data Deletion Processing in Browser Storage>

Figure 13:
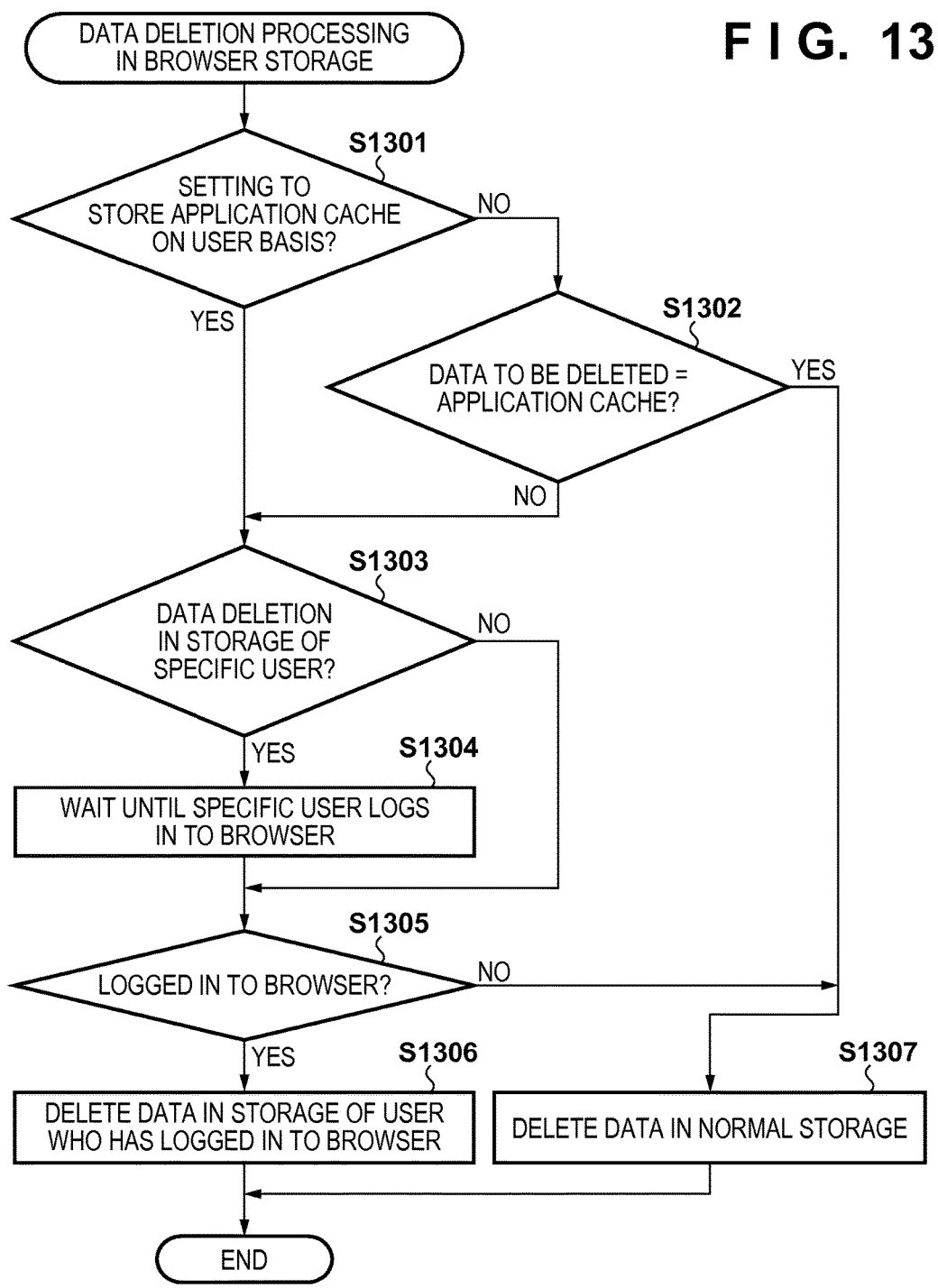
FIG. 13 is a flowchart showing an example of the procedure of data deletion processing of the browser storage.

FIG. 13 is a flowchart showing an example of the procedure of processing executed when the web browser 201 deletes data in the browser storage. In this processing, when the user has logged in to the web browser 201, data in the user-specific storage of the user who has logged in is deleted. On the other hand, when the user has not logged in to the web browser 201, data in the normal storage is deleted.

When data deletion processing in the browser storage starts, in step S1301, the interpreter determines whether a setting to store an application cache in the user-specific storage has been made. This determination is done in accordance with the setting of the checkbox 701 shown in FIG. 7. If the interpreter determines that a setting to store an application cache in the user-specific storage has been made, the process advances to step S1303. If the interpreter determines that a setting to store an application cache in the user-specific storage has not been made, the process advances to step S1302.

Next, in step S1302, the interpreter determines whether deletion target data under processing is an application cache. If the interpreter determines that the deletion target data under processing is an application cache, the process advances to step S1307. If the interpreter determines that the deletion target data under processing is not an application cache, the process advances to step S1303.

In step S1303, the interpreter determines whether data deletion under processing is processing for the user-specific storage of a specific user. As in step S903, for example, if the processing shown in FIG. 13 operates as background processing for the user-specific storage of a specific user, the processing needs to be performed for the user-specific storage of the specific user. Hence, it is determined whether data deletion under processing is processing for the user-specific storage of a specific user. This determination can be done based on, for example, the storage destination (for example, address) of the processing target. If the interpreter determines that data deletion under processing is processing for the user-specific storage of a specific user, the process advances to step S1304. If the interpreter determines that data deletion under processing is not processing for the user-specific storage of a specific user, the process advances to step S1305. Note that background processing for the user-specific storage of a specific user includes synchronization executed in accordance with the operation of a web worker. When deleting a local resource in synchronism with the resource of a web site, the processing shown in FIG. 13 is executed in synchronization processing executed in the background to delete data of the resource from the web storage or the like.

In step S1304, the interpreter waits until the specific user logs in to the browser. That is, if data deletion under processing is processing for the user-specific storage of a specific user, the interpreter controls not to perform the processing until the specific user logs in to the browser. If the interpreter determines that the specific user has logged in to the browser or already logged in to the browser, the process advances to step S1305.

In step S1305, the interpreter determines whether the user has logged in to the browser. If the interpreter determines that the user has logged in to the browser, the process advances to step S1307. If the interpreter determines that the user has not logged in to the browser, the process advances to step S1306.

In step S1306, the interpreter deletes target data in the user-specific storage of the user who has logged in to the browser, and ends the processing.

On the other hand, in step S1307, the interpreter deletes target data in the normal storage, and ends the processing.

With the above-described procedure, according to the settings, when the user has logged in, data such as a resource is deleted from the user-specific storage of the login user. For example, if processing is performed for the user-specific storage in synchronization processing that operates in the background, and the user is not in the login state, execution of deletion processing waits until the user logs in. The processing is executed after the login state is attained.

With the procedures shown in FIGS. 9 to 13, when saving data such as an application cache or resource in the user-specific storage, the data is encrypted. When reading out data from there, the data is decrypted. This makes it possible to store a cache or resource on a user basis, and also increase the security of the user-specific storage and protect it from, for example, readout by another user. In addition, alteration can be prevented not only by encryption described in the embodiment but also by, for example, adding an electronic signature.

<Data Import Processing to Browser Storage>

Figure 14:
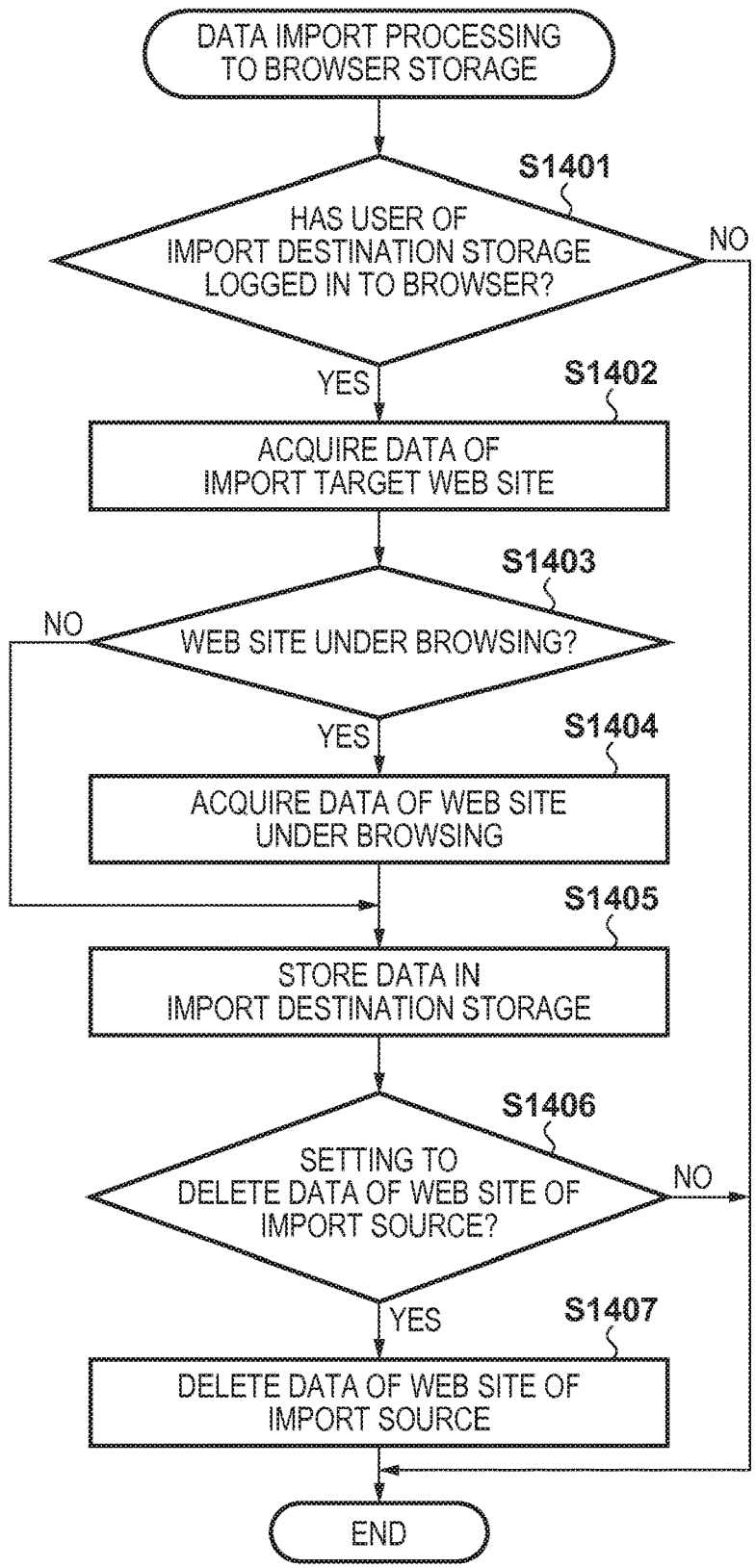
FIG. 14 is a flowchart showing an example of the procedure of data import processing to the browser storage.

FIG. 14 is a flowchart showing an example of the procedure of processing executed when the web browser 201 imports data to the browser storage. This processing is executed when the button 804 in the local data import screen shown in FIG. 8 is pressed. In this processing, data is imported to the browser storage in accordance with the setting contents in the local data import screen shown in FIG. 8.

When data import processing to the browser storage starts, in step S1401, the interpreter determines whether the user (user who has executed import) of the browser storage of the import destination has logged in to the browser. If the interpreter determines whether the user of the browser storage of the import destination has logged in to the browser, the process advances to step S1402. In addition, if the browser storage of the import destination is the normal storage, it is determined that the user has logged in to the browser. If the interpreter determines that the user of the browser storage of the import destination has not logged in to the browser, the processing ends without executing data import.

In step S1402, the interpreter acquires data of the import target web site from the browser storage in accordance with the setting of the web site list 801 shown in FIG. 8. If the data of the import target web site is stored in the user-specific storage, the acquired data is decrypted.

In step S1403, the login user determines whether the web site under browsing by the web browser 201 is included. If the web site under browsing exists, the process advances to step S1404 to acquire the data of the web site under browsing. The data of the web site under browsing may be downloaded from the web site and acquired. Note that in this case, since the web browser is executing the browsing processing of the site, the processing of step S1403 is executed in the background. Alternatively, if the site under browsing is the storage target of the application cache or local storage, the data may be acquired from application cache or local storage shared or used by the user who is browsing.

In step S1405, the interpreter stores the data acquired in steps S1402 and S1404 in the browser storage of the import destination. If browser storage of the import destination is the user-specific storage, the data is encrypted and stored.

In step S1406, the interpreter determines whether a setting to delete data of the import source has been made. This determination is done in accordance with the setting by the checkbox 803 shown in FIG. 8. If the interpreter determines that a setting to delete data of the import source has been made, the process advances to step S1405. If the interpreter determines that a setting to delete data of the import source has not been made, the processing ends.

In step S1407, the interpreter deletes the data of the import source, and ends the processing.

With the above-described procedure, it is possible to import the content of a designated web site to the browser storage including the local storage of the user.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-181597, filed Sep. 5, 2014 which is hereby incorporated by reference herein in its entirety.

What is claimed is:

1. An information processing terminal in which an operating system operates, comprising:
a memory storing instructions related to a web browser operating on the operating system; and
a processor which is capable of executing the instructions causing the information processing terminal to:
manage user information corresponding to one or more users registered in the web browser;
receive data to be saved in a reserved area reserved for the web browser from a web site accessed via the web browser;
in a case where specific user information has been input to the web browser to login as a user having been registered to the web browser, encrypt the received data;
save the encrypted data in a storage out of the reserved area corresponding to the specific user information, wherein the saved data in the storage is not data corresponding to an application cache, and
synchronize data saved in the reserved area reserved for the web browser with a corresponding web site as a background process on the information processing terminal, wherein data in the storage within the reserved area corresponding to user information of a user who has not logged-in is not used for a synchronization on the background process.

2. The terminal according to claim 1, wherein the instructions further cause the information processing terminal to request login using user information corresponding to the storage when accessing the storage in which data corresponding to the web site accessed via the web browser is saved.

3. The terminal according to claim 1, wherein the instructions further cause the information processing terminal to save, if the received data is data corresponding to the application cache, the data not in the storage corresponding to the specific user information but in a shared storage.

4. The terminal according to claim 1, wherein the instructions further cause the information processing terminal to enable deletion of the data saved in the storage out of the reserved area corresponding to the specific user information in the case where the specific user information is input to the web browser to login.

5. The terminal according to claim 1, wherein the instructions further cause the information processing terminal to acquire and decrypt the data saved in the storage out of the reserved area corresponding to the specific user information in the case where the specific user information is input to the web browser to login.

6. The terminal according to claim 1, wherein the instructions further cause the information processing terminal to make a notification to request login when saving the data from the web site accessed via the web browser.

7. The terminal according to claim 6, wherein the accessed web site is an access-protected web site.

8. The terminal according to claim 6, wherein the notification is made in accordance with an instruction from the accessed web site.

9. The terminal according to claim 6, wherein the notification is made in accordance with a login state to the operating system.

10. The terminal according to claim 1, wherein the instructions further cause the information processing terminal to import data in a storage corresponding to another user information registered in advance to a storage corresponding to user information.

11. The terminal according to claim 10, wherein when registering the data in the storage corresponding to the other user information, which is to be imported, input of the user information of the other user is required.

12. A non-transitory computer-readable medium that has recorded thereon a program that causes a computer to execute a procedure, the procedure comprising:
- managing user information corresponding to one or more users registered in the web browser;
- receiving, from web site accessed via a web browser, data to be saved in a reserved area reserved for the web browser;
- in a case where user information has been input, and a user corresponding to the user information logs in as a user having been registered to the web browser, encrypting the received data;
- saving the encrypted data in a storage corresponding to the user information, wherein the saved data in the storage is not data corresponding to an application cache, and
- synchronizing data saved in the reserved area reserved for the web browser with a corresponding web site as a background process on the information processing terminal, wherein data in the storage within the reserved area corresponding to user information of a user who has not logged-in is not used for a synchronization on the background process.

13. The non-transitory computer-readable medium according to claim 12, wherein the procedure further comprises requesting login using user information corresponding to the storage when accessing the storage in which data corresponding to the accessed web site is saved.

14. The non-transitory computer-readable medium according to claim 12, wherein if the received data is data corresponding to the application cache, the data is not saved in the storage corresponding to the user information but saved in a shared storage.

15. The non-transitory computer-readable medium according to claim 12, wherein the procedure further comprises making a notification to request login when saving the data from the accessed web site.

16. The non-transitory computer-readable medium according to claim 15, wherein the notification is made when the accessed web site is an access-protected web site.

17. The non-transitory computer-readable medium according to claim 15, wherein the notification is made in accordance with an instruction from the accessed web site.

18. The non-transitory computer-readable medium according to claim 15, wherein the notification is made in accordance with a login state to an operating system on which a web browser operates.

19. A browser storage management method by an information processing terminal in which a web browser as an application operates, comprising:
- managing user information corresponding to one or more users registered in the web browser;
- receiving data to be saved in a reserved area reserved for the web browser from a web site accessed via the web browser;
- in a case where specific user information has been input to the web browser to login as a user having been registered to the web browser, encrypting the received data;
- saving the encrypted data in a storage out of the reserved area corresponding to the specific user information, wherein the saved data in the storage is not data corresponding to an application cache, and
- synchronizing data saved in the reserved area reserved for the web browser with a corresponding web site as a background process on the information processing terminal, wherein data in the storage within the reserved area corresponding to user information of a user who has not logged-in is not used for a synchronization on the background process.

* * * * *